UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

POLYARSENO COMPOUNDS AND PROCESS OF MAKING SAME.

1,100,720.      Specification of Letters Patent.      Patented June 23, 1914.

No Drawing.      Application filed July 16, 1913. Serial No. 779,356.

*To all whom it may concern:*

Be it known that we, PAUL EHRLICH, M. D., professor of medicine, and ALFRED BERTHEIM, Ph. D., chemist, citizens of the Empire of Germany, residing at Frankfort-on-the-Main, Germany, have invented certain new and useful Improvements in Polyarseno Compounds and Processes of Making Same, of which the following is a specification.

We have found that new arseno compounds of great therapeutical value can be obtained by reducing mixtures of aromatic arsinic acids and inorganic arsenic compounds. The compounds thus produced contain more than one atom of arsenic to one aromatic residue, the percentage of arsenic being the higher, the greater the quantity of inorganic arsenic compound which is used for one molecule of arsinic acid. It is very probable that these new compounds represent a complex of atoms composed of several arsenic atoms; therefore they may be termed "polyarseno compounds". They are yellow to reddish-brown powders, which are oxidized by hydrogen peroxid with simultaneous formation of an aromatic arsinic acid and arsenic acid; they are insoluble in water, scarcely soluble in ether, benzene and petroleum, difficultly soluble in strong hydrochloric acid, and decompose when heated. They are of great therapeutical value in the treatment of animals infected with tripanosomes.

The following example illustrates our invention: 23.3 grams of 3.4-aminoöxyphenyl-arsinic acid are dissolved in 400 cc. of water plus 60 cc. of 2N caustic soda lye, and 13 grams of sodium arsenite are dissolved in 500 cc. of water. These solutions are mixed and neutralized with 50 cc. of 2N acetic acid. The whole is then poured into a solution of 500 grams of sodium hydrosulfite and 100 grams of magnesium chlorid in 2.5 liters of water and digested at 50–55° C., while well stirring, until a filtered sample, when heated, no longer separates a precipitate. The precipitate which is copiously formed is filtered off, washed and dried in vacuo. It is an orange-colored powder, which is oxidized in alkaline solution by means of hydrogen peroxid with formation of aminoöxyphenylarsinic acid and arsenic acid. It is difficultly soluble in ether, benzene, alcohol and concentrated hydrochloric acid. It is readily dissolved by diluted hydrochloric acid and by aqueous caustic soda lye, and a difficultly-soluble sulfate is precipitated from the hydrochloric solution by the addition of surfuric acid.

Having now described our invention, what we claim is:

1. The process of producing polyarseno compounds, which consists in reducing mixtures of aromatic arsinic acids and inorganic arsenic compounds.

2. As new products, polyarseno compounds which contain more than one atom of arsenic to one aromatic residue, being yellow to reddish-brown powders, which are split up by hydrogen peroxid with simultaneous formation of an aromatic arsinic acid and arsenic acid, are scarcely soluble in ether, benzene and petroleum, difficultly soluble in strong hydrochloric acid, and decompose when heated.

3. As a new product, the compound obtained by reducing a mixture of equivalent quantities of 3.4-aminoöxybenzene-arsinic acid and sodium arsenite, being an orange-yellow powder, which is oxidized by hydrogen-peroxid in alkaline solution with formation of aminoöxyphenylarsinic acid and arsenic acid, is difficultly soluble in ether, benzene, alcohol and concentrated hydrochloric acid, and readily dissolves in diluted hydrochloric acid and aqueous caustic soda lye, a difficultly-soluble sulfate being precipitated from the hydrochloric solution by the addition of sulfuric acid.

In testimony whereof, we affix our signatures in the presence of two witnesses.

PAUL EHRLICH.
ALFRED BERTHEIM.

Witnesses:
    JEAN GRUND,
    CARL GRUND.